US008008236B2

(12) United States Patent
Welton

(10) Patent No.: US 8,008,236 B2
(45) Date of Patent: *Aug. 30, 2011

(54) ORTHO ESTER BREAKERS FOR VISCOELASTIC SURFACTANT GELS AND ASSOCIATED METHODS

(75) Inventor: Thomas D. Welton, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 238 days.

This patent is subject to a terminal disclaimer.

(21) Appl. No.: 11/588,886

(22) Filed: Oct. 27, 2006

(65) Prior Publication Data

US 2008/0103069 A1    May 1, 2008

(51) Int. Cl.
| | |
|---|---|
| C09K 8/524 | (2006.01) |
| C09K 8/60 | (2006.01) |
| C09K 8/528 | (2006.01) |
| C09K 8/584 | (2006.01) |
| C09K 8/78 | (2006.01) |
| C09K 8/532 | (2006.01) |
| E21B 43/00 | (2006.01) |
| E21B 43/16 | (2006.01) |
| E21B 43/22 | (2006.01) |
| C23F 11/18 | (2006.01) |

(52) U.S. Cl. ........ 507/261; 507/239; 507/240; 507/241; 507/245; 507/252; 507/253; 507/254; 507/255; 507/256; 507/257; 507/258; 507/260; 507/262; 507/269; 507/271; 166/268; 166/270.1

(58) Field of Classification Search .......... 507/239, 507/240, 241, 245, 252, 253, 254, 255, 256, 507/257, 258, 260, 261, 262, 269, 271; 166/268, 166/270.1

See application file for complete search history.

(56) References Cited

U.S. PATENT DOCUMENTS

| | | | |
|---|---|---|---|
| 6,258,859 B1 | 7/2001 | Dahayanake et al. | 516/77 |
| 6,877,563 B2 | 4/2005 | Todd et al. | 166/312 |
| 6,881,709 B2 | 4/2005 | Nelson et al. | 507/203 |
| 6,883,608 B2 | 4/2005 | Parlar et al. | 166/278 |
| 6,908,888 B2 | 6/2005 | Lee et al. | 507/219 |
| 7,021,383 B2 | 4/2006 | Todd et al. | 166/307 |
| 7,036,585 B2 | 5/2006 | Zhou et al. | 166/268 |
| 7,052,901 B2 | 5/2006 | Crews | 435/281 |
| 2002/0004464 A1* | 1/2002 | Nelson et al. | 507/200 |
| 2002/0193257 A1 | 12/2002 | Lee et al. | |
| 2004/0176478 A1 | 9/2004 | Dahayanake et al. | 516/77 |
| 2005/0034868 A1* | 2/2005 | Frost et al. | 166/278 |
| 2005/0155762 A1 | 7/2005 | Chen et al. | |
| 2005/0252659 A1* | 11/2005 | Sullivan et al. | 166/280.1 |
| 2006/0041028 A1 | 2/2006 | Crews | 516/135 |
| 2006/0180308 A1 | 8/2006 | Welton et al. | 166/282 |
| 2006/0180309 A1 | 8/2006 | Welton et al. | 166/282 |
| 2006/0180310 A1 | 8/2006 | Welton et al. | 166/283 |
| 2006/0183646 A1 | 8/2006 | Welton et al. | 507/259 |
| 2008/0103070 A1 | 5/2008 | Welton | |

OTHER PUBLICATIONS

J. Amer. Chem. Soc., 1977, 99 (14), pp. 4827-4829.*
*BioMacromolecules*, "Poly(ortho esters)—From Concept to Reality"; American Chemical Society; vol. 5, No. 5, Sep./Oct. 2004.
Office Action for U.S. Appl. No. 11/589,022 dated Apr. 8, 2010.
Office Action for U.S. Appl. No. 11/589,022, dated Aug. 11, 2009.
Notice of Allowance and Notice of Allowability for U.S. Appl. No. 11/589,022 dated Mar. 3, 2011.
Office Action for U.S. Appl. No. 11/589,022 dated Jul. 21, 2010.
Office Action for U.S. Appl. No. 11/589,022 dated Nov. 16, 2010.

* cited by examiner

*Primary Examiner* — Timothy J. Kugel
*Assistant Examiner* — Atnaf Admasu
(74) *Attorney, Agent, or Firm* — Robert A. Kent; McDermott Will & Emery LLP

(57) ABSTRACT

Many methods are provided including a method comprising: providing a surfactant gel having a first viscosity that comprises an aqueous base fluid and a surfactant; providing an ortho ester breaker; contacting the surfactant gel with the ortho ester breaker; allowing the ortho ester breaker to hydrolyze to produce an acid and an alcohol; and allowing the acid and/or the alcohol to interact with the surfactant gel so as to reduce the first viscosity of the surfactant gel to a second viscosity. Other methods are provided that include a method comprising: providing a surfactant gel that comprises an aqueous base fluid and a surfactant having a first viscosity; placing the surfactant gel into a subterranean formation; providing an ortho ester breaker; contacting the breaker with the surfactant gel; allowing the breaker to hydrolyze to produce an acid and an alcohol; and allowing the acid and/or the alcohol to interact with the surfactant gel so as to reduce the first viscosity of the surfactant gel to a second viscosity.

17 Claims, No Drawings

ORTHO ESTER BREAKERS FOR VISCOELASTIC SURFACTANT GELS AND ASSOCIATED METHODS

BACKGROUND

This invention relates to compositions and methods used in reducing the viscosity of surfactant gels, especially for use in treatment of subterranean formations and oil and gas wells.

Viscoelastic surfactant gels normally are made by mixing appropriate amounts of suitable surfactants, such as anionic, cationic, nonionic and zwitterionic surfactants. The viscosity of viscoelastic surfactant gels has been attributed to the three dimensional structure formed by these components when mixed. When the concentration of surfactants in a viscoelastic fluid significantly exceeds a critical concentration, and in most cases in the presence of an electrolyte, surfactant molecules aggregate into species such as micelles, which can interact to form a network exhibiting elastic behavior. As used herein, the term "micelle" is defined to include any structure that minimizes the contact between the lyophobic ("solvent-repelling") portion of a surfactant molecule and the solvent, for example, by aggregating the surfactant molecules into structures such as spheres, cylinders, or sheets, wherein the lyophobic portions are on the interior of the aggregate structure and the lyophilic ("solvent-attracting") portions are on the exterior of the structure. These micelles may function, among other purposes, to stabilize emulsions, break emulsions, stabilize a foam, change the wetability of a surface, solubilize certain materials, and/or reduce surface tension. When used as a gelling agent, the molecules (or ions) of the surfactants used associate to form micelles of a certain micellar structure (e.g., rodlike, wormlike, vesicles, etc., which are referred to herein as "viscosifying micelles") that, under certain conditions (e.g., concentration, ionic strength of the fluid, etc.) are capable of, inter alia, imparting increased viscosity to a particular fluid and/or forming a gel. Certain viscosifying micelles may impart increased viscosity to a fluid such that the fluid exhibits viscoelastic behavior (e.g., shear thinning properties) due, at least in part, to the association of the surfactant molecules contained therein. As used herein, the term "surfactant gel" refers to a fluid[[s]] that exhibits or is capable of exhibiting viscoelastic behavior due, at least in part, to the association of surfactant molecules contained therein to form viscosifying micelles.

After the surfactant gel has performed its desired function, it is oftentimes desirable to "break" the gel, i.e., reduce its viscosity. Currently, surfactant gels rely upon two methods of breaking: dilution with formation fluids and chemical breakers. Dilution with formation fluids is an unreliable method. For example, in oilfield applications, the viscosity of viscoelastic surfactant gels may be reduced or lost upon exposure to formation fluids (e.g., crude oil, condensate and/or water); and this viscosity reduction or loss effectuates cleanup of the reservoir, fracture, or other treated area. However, in some circumstances, it is desirable to have a better control of that breaking, for instance, when breaking of the fluid is desired at a particular time or condition, when it is desired to accelerate viscosity reduction, or when the natural influx of reservoir fluids (for example, in dry gas reservoirs) does not break or breaks incompletely the viscoelastic surfactant gel. Using chemical breakers can be complicated. Various types of alcohols, organic acids, enzymes, transition metals (e.g., iron), and salts are known to impart a reduction of the viscosity of a viscoelastic gel or even to completely "break" the gel. Such chemical breakers may be added to a pad or a pre-pad fluid, or they may be used in such a way as the mechanism relies upon melting, slow dissolution of a solid, de-adsorption of a breaking agent absorbed into a solid particle, or the breaking of a coating (encapsulated breaker). Oftentimes, such breakers remain in the fractures in the subterranean formation, and as a result, do not contact the gel to a sufficient extent to adequately break the gel. Moreover, if the breaker is a solid breaker, the breaker is likely to settle out of the gel, which can result in either an inefficient or premature break of the surfactant gel.

Therefore, among other needs, needs may exist that may relate to methods for breaking viscoelastic surfactant gels after subterranean oil or gas well treatments, at predetermined times or conditions and/or when they are not broken by the natural influx of reservoir fluids.

SUMMARY

This invention relates to compositions and methods used in reducing the viscosity of surfactant gels, especially for use in treatment of subterranean formations and oil and gas wells.

In one embodiment, the present invention provides a method comprising: providing a surfactant gel having a first viscosity that comprises an aqueous base fluid and a surfactant; providing an ortho ester breaker; contacting the surfactant gel with the ortho ester breaker; allowing the ortho ester breaker to hydrolyze to produce an acid and an alcohol; and allowing the acid and/or the alcohol to interact with the surfactant gel so as to reduce the first viscosity of the surfactant gel to a second viscosity.

In another embodiment, the present invention provides a method comprising: providing a surfactant gel that comprises an aqueous base fluid and a surfactant having a first viscosity; placing the surfactant gel into a subterranean formation; providing an ortho ester breaker; contacting the breaker with the surfactant gel; allowing the breaker to hydrolyze to produce an acid and an alcohol; and allowing the acid and/or the alcohol to interact with the surfactant gel so as to reduce the first viscosity of the surfactant gel to a second viscosity.

The features and advantages of the present invention will be readily apparent to those skilled in the art. While numerous changes may be made by those skilled in the art, such changes are within the spirit of the invention.

DESCRIPTION OF PREFERRED EMBODIMENTS

This invention relates to compositions and methods used in reducing the viscosity of surfactant gels, especially for use in treatment of subterranean formations and oil and gas wells.

Compositions and methods for initiating, controlling or enhancing the breaking of surfactant gels and/or surfactant gel residue with ortho ester breakers are provided. In certain embodiments, this may be accomplished in a subterranean formation. The surfactant gel residue, in some embodiments, may be in the form of an emulsion. One of the many advantages of the present invention is that delayed breaking of such surfactant gels may be achieved without compromising the initial fluid properties, e.g., those required for proppant suspension and transport during a fracturing operation. One of the many advantages of the present invention is that the breaking of the surfactant gels of this invention can be delayed for a desired delay period (e.g., days or even weeks). On the other hand, breaking of the surfactant gels can occur relatively quickly and predictably if necessary, without relying on contact with formation fluids. Additionally, the breaker should stay with the surfactant gel, enabling an efficient and effective break at the desired time.

The methods of the present invention include a method that comprises: providing a surfactant gel having a first viscosity that comprises an aqueous base fluid and a surfactant having a first viscosity; providing an ortho ester breaker; contacting the breaker with the surfactant gel with the ortho ester breaker; allowing the ortho ester breaker to hydrolyze to produce an acid and an alcohol; and allowing the acid and/or the alcohol to interact with the surfactant gel so as to reduce the first viscosity of the surfactant gel to a second viscosity. In another embodiment, the present invention provides a method comprising: providing a surfactant gel residue having a first viscosity; providing an ortho ester breaker; contacting the surfactant gel residue with the ortho ester breaker; allowing the ortho ester breaker to hydrolyze to produce an acid and an alcohol; and allowing the acid and/or the alcohol to interact with the surfactant gel residue so as to reduce the first viscosity of the surfactant gel residue to a second viscosity. In a preferred embodiment, a base may be added to the surfactant gel and/or the breaker to further delay the hydrolysis of the ortho ester breaker.

The aqueous base fluids used in the surfactant gels of the present invention may comprise fresh water, saltwater (e.g., water containing one or more salts dissolved therein), brine, seawater, or derivatives and combinations thereof. Generally, the water may be from any source, treated or untreated, provided that it does not contain certain concentrations of components that might adversely affect the stability and/or performance of the surfactant gels of the present invention, for example, copper ions, iron ions, or certain types of organic materials (e.g., lignin). In certain embodiments, the density of the aqueous base fluid can be increased, among other purposes, to provide well control properties and/or provide additional particle transport and suspension in the surfactant gels of the present invention. In certain embodiments, the pH of the aqueous base fluid may be adjusted (e.g., by a buffer or other pH adjusting agent), among other purposes, and/or to reduce the viscosity of the treatment fluid. In these embodiments, the pH may be adjusted to a specific level, which may depend on, among other factors, the types of gelling agents, cross linking agents, and/or breakers included in the treatment fluid. One of ordinary skill in the art, with the benefit of this disclosure, will recognize when such density and/or pH adjustments are appropriate.

The surfactants included in the surfactant gels of the present invention may comprise any suitable surfactant that is capable of imparting viscoelastic properties to an aqueous fluid. These surfactants may be zwitterionic, cationic, anionic, or amphoteric in nature, and comprise any number of different compounds, including methyl ester sulfonates (as described in U.S. Pat. Nos. 7,299,874, 7,159,659, 7,303,019 and U.S. Patent Publication Number 2006/0183646), betaines, modified betaines, sulfosuccinates, taurates, amine oxides, ethoxylated fatty amines, quaternary ammonium compounds, derivatives thereof, and combinations thereof. The term "derivative" is defined herein to include any compound that is made from one of the listed compounds, for example, by replacing one atom in one of the listed compounds with another atom or group of atoms, ionizing one of the listed compounds, or creating a salt of one of the listed compounds.

The surfactant should be present in a surfactant gel of the present invention in an amount sufficient to provide the desired viscosity (e.g., sufficient viscosity to divert flow, reduce fluid loss, suspend particulates, etc.) therein through formation of viscosifying micelles. In certain embodiments, the surfactant may be present in an amount in the range of from about 0.1% to about 20% by volume of the surfactant gel. In certain embodiments, the surfactant may be present in an amount in the range of from about 2% to about 10% by volume of the surfactant gel.

If desired, the surfactant gels of the present invention may comprise at least one metal ion having at least two oxidation states wherein at least one of the oxidation states interferes with the ability of the surfactant to form viscosifying micelles. The metal ion may be present in any of its oxidation states, or in a mixture thereof, depending upon the viscoelastic properties of the fluid desired for a particular use of a fluid and/or stage of that use. For example, if low level of viscosity is desired (e.g., below about 20 cP @511 s−1), then at least a portion of the metal ion may be present in an oxidation state that interferes with the ability of the surfactant included in the surfactant gels to form viscosifying micelles. However, if a higher viscosity is desired, then the portion of the metal ion in an oxidation state that interferes with the ability of the surfactant included in the fluid to form viscosifying micelles should be below a certain amount. In certain embodiments, the methods and compositions of the present invention may be utilized to maintain and/or impart a viscosity in a viscoelastic surfactant fluid above about 20 cP, as measured using a FANN Model 35A viscometer with a standard bob and sleeve using a #1 spring at 300 rpm (511 s$^{-1}$). One of ordinary skill with the benefit of this disclosure will recognize the oxidation state of the metal ion to include to produce the desired level of viscosity, depending on, among other factors, the type of surfactant used, the surfactant concentration, the type of metal ion, and other related factors.

In certain embodiments, the metal ion included in the surfactant gels of the present invention may comprise iron, which has at least the iron II ($Fe2+$) and iron III ($Fe3+$) oxidation states. In those embodiments where the metal ion comprises iron, it is believed that at least the iron III oxidation state interferes with the ability of the surfactant in a viscoelastic surfactant fluid to form viscosifying micelles. Other examples of metal ions that may be included in the surfactant gels of the present invention include, but are not limited to, zinc, tin, chromium, or any combination of suitable metal ions. For example, chromium III ($Cr^{3+}$), from compounds such as $Cr_2O_3$, may interfere with the ability of a surfactant in a viscoelastic surfactant fluid to form viscosifying micelles, while chromium VI ($Cr^{6+}$), from compounds such as $Cr_2O_3$, may not interfere with the ability of a surfactant in a viscoelastic surfactant fluid to form viscosifying micelles. In certain embodiments, the metal ions utilized in the present invention already may be present in fluid a surfactant gel whose viscosity is being controlled. In certain embodiments, the metal ions may be added to a surfactant gel in an additive comprising those metal ions, for example, as a breaker and/or a gelling agent of the present invention. The metal ion may be provided, in a viscoelastic surfactant fluid of the present invention or in a separate additive comprising the ion (e.g., a breaker and/or a gelling agent of the present invention), as a bare ion, as a component of some other molecule, and/or as an ion that is chemically associated (e.g., chelated) with some other molecule. In embodiments wherein the metal ion is provided as a component of some other molecule, that molecule may be formulated to release the metal ion in a delayed manner and/or to be "triggered" to release the metal ion by certain conditions (e.g., temperature, pH, etc.). For example, a molecule comprising the metal ion may release the metal ion in a delayed manner by slowly dissolving in the aqueous-base fluid. One example of a substance that may release an iron ion in this manner is hematite.

In certain embodiments, the metal ion (or molecule comprising the metal ion) may be encapsulated with various materials, which, among other things, may delay its release into the viscoelastic surfactant fluid. Solid redox reagents can be encapsulated by spray coating a variety of materials thereon. Such coating materials include, but are not limited to, waxes, drying oils such as tung oil and linseed oil, polyurethanes and cross-linked partially hydrolyzed polyacrylics. Degradable polymers such as polyesters, poly lactic acid, and the like may also be used if desired. The redox reagent also may be encapsulated in the form of an aqueous solution contained within a particulate porous solid material that remains dry and free flowing after absorbing an aqueous solution and through which the aqueous solution slowly diffuses. Examples of such particulate porous solid materials include, but are not limited to, diatomaceous earth, zeolites, silica, alumina, metal salts of alumino-silicates, clays, hydrotalcite, styrene-divinylbenzene based materials, cross-linked polyalkylacrylate esters, and cross-linked modified starches. In order to provide additional delay to the redox reagents encapsulated in a particulate porous solid material described above, an external coating of a polymeric material through which an aqueous solution slowly diffuses can be placed on the porous solid material. Examples of such polymeric materials include, but are not limited to, EDPM rubber, polyvinyldichloride (PVDC), nylon, waxes, polyurethanes and cross linked partially hydrolyzed acrylics.

In certain embodiments of the present invention, the metal ion or combination of metal ions may be present in an amount in the range of from about 10 ppm to about 10,000 ppm by volume of the surfactant gel. In certain embodiments, the metal ion or combination of metal ions may be present in an amount in the range of from about 100 ppm to about 2,000 ppm by volume of the surfactant gel. The type and amount of the metal ion(s) suitable in a particular application of the present invention may depend upon a variety of factors, such as the type of surfactant present in the surfactant gel, the temperature of the fluid, and the like. A person of ordinary skill, with the benefit of this disclosure, will recognize the appropriate type and amount of metal ions to include in a particular application of the present invention.

The viscoelastic surfactant fluids of the present invention may further comprise a "redox reagent," which is defined herein to include any substance that is capable of changing the oxidation state of a metal ion(s) to the desired oxidation state. For example, the redox reagent may comprise a reagent that is capable of changing the oxidation state of the metal ion to a state that exhibits a lesser tendency to interfere with the ability of the surfactant to form viscosifying micelles, which may, inter alia, facilitate an increase in the viscosity of the surfactant gel. In certain embodiments, the redox agent may be capable of changing iron III to iron II. In other embodiments, the redox reagent may comprise a reagent that is capable of changing the oxidation state of the metal ion to a state that exhibits an increased tendency to interfere with the ability of the surfactant to form viscosifying micelles, which may, inter alia, facilitate a reduction in the viscosity of the viscoelastic surfactant fluid. For example, in certain embodiments, the redox agent may be capable of changing iron II to iron III. Depending on the desired function of the redox reagent in a particular application of the present invention (i.e., oxidizing or reducing the metal ion(s)), the redox reagent may comprise a reducing agent or an oxidizing agent. Examples of suitable reducing agents include, but are not limited to, thioglycolic acid (or a salt thereof), erythorbic acid (or a salt thereof), and stannous chloride. Fe-5A™ iron control agent and Fe-8M™ iron control agent, available from Halliburton Energy Services, Inc., Duncan, Okla., are examples of commercially-available reducing agents. Examples of suitable oxidizing agents include, but are not limited to, sodium persulfate, potassium persulfate, ammonium persulfate, potassium permanganate, sodium permanganate, sodium perborate, potassium perborate, sodium periodate, potassium periodate, sodium bromate and lithium hypochlorite. Examples of commercially-available oxidizing agents include SP™ Breaker agent available from Halliburton Energy Services, Inc, Duncan, Okla., OXOL™ II Cleaning service available from Halliburton Energy Services, Inc, Duncan, Okla., and GBW-40™ Breaker available from Halliburton Energy Services, Inc, Duncan, Okla.

The redox reagents utilized in the surfactant gels of the present invention may be formulated to change the oxidation state of the metal ion(s) in a delayed manner, or to be "triggered" by certain conditions (e.g., temperature, pH, etc.). For example, the redox reagent may be encapsulated with various materials, which, among other things, may delay its reaction with the metal ion. Solid redox reagents can be encapsulated by any suitable technique including spray coating a variety of coating materials thereon. Such coating materials include, but are not limited to, waxes, drying oils such as tung oil and linseed oil, polyurethanes and cross-linked partially hydrolyzed polyacrylics. The redox reagent also may be encapsulated in the form of an aqueous solution contained within a particulate porous solid material that remains dry and free flowing after absorbing an aqueous solution and through which the aqueous solution slowly diffuses. Examples of such particulate porous solid materials include, but are not limited to, diatomaceous earth, zeolites, silica, alumina, metal salts of alumino-silicates, clays, hydrotalcite, styrene-divinylbenzene based materials, cross-linked polyalkylacrylate esters, and cross-linked modified starches. In order to provide additional delay to the redox reagents encapsulated in a particulate porous solid material described above, an external coating of a polymeric material through which an aqueous solution slowly diffuses can be placed on the porous solid material. Examples of such polymeric materials include, but are not limited to, EDPM rubber, polyvinyldichloride (PVDC), nylon, waxes, polyurethanes and cross linked partially hydrolyzed acrylics. In other embodiments, the redox reagent may be formulated in such a way that it becomes reactive only at certain temperatures. An example of a commercially-available redox reagent that reacts in this manner is Ferchek® ferric iron inhibitor, an iron reducing agent available from Halliburton Energy Services, Inc., Duncan, Okla.

The redox reagent may be present in the surfactant gels of the present invention in any amount sufficient to change the oxidation state of at least a portion of the metal ion(s) present. In certain embodiments, the redox reagent may be present in an amount in the range of from about 0.01% to about 10% by volume of the viscoelastic surfactant fluid. In certain embodiments, the redox reagent may be present in an amount in the range of from about 0.05% to about 2% by volume of the viscoelastic surfactant fluid. The amount of the redox reagents suitable in a particular application of the present invention may depend upon a variety of factors, such as the type of surfactant present in the viscoelastic surfactant fluid, the amount of metal ion(s) present, the temperature of the fluid, and the like. A person of ordinary skill, with the benefit of this disclosure, will recognize the appropriate amount of the redox reagent to include in a particular application of the present invention.

Examples of suitable ortho esters for use in the ortho ester breakers of the present invention have a structure described by the formula: RC(OR')(OR'')(OR'''), wherein R', R'', and R''' are not hydrogen, and R', R'', and R''' may or may not be the same group. R', R'', or R''' may comprise a heteroatom that may affect the solubility of the chosen ortho ester in a given application. Suitable heteroatoms could include nitrogen or oxygen. Suitable poly(ortho esters) also are described in an article entitled, Poly(ortho esters)—From Concept to Reality, BIOMACROMOLECULES, Vol 5, 1625 (2004), and references cited therein. Examples of suitable ortho esters and poly(ortho esters) include, but are not limited to, orthoacetates, such as trimethyl orthoacetate, triethyl orthoacetate, tripropyl orthoacetate, triisopropyl orthoacetate, tributyl orthoacetates, and poly(orthoacetates); orthoformates, such as trimethyl orthoformate, triethyl orthoformate, tripropyl orthoformate, triisopropyl orthoformate, tributyl orthoformate, and poly(orthoformates); and orthopropionates, such as trimethyl orthopropionate, triethyl orthopropionate, tripropyl orthopropionate, triisopropyl orthopropionate, tributyl orthopropionate, and poly(orthopropionates). Suitable ortho esters also may be ortho esters of polyfunctional alcohols, such as glycerin and/or ethylene glycol. Those skilled in the art with the benefit of this disclosure will recognize suitable ortho esters and/or poly(ortho esters) that may be used in a desired application. In choosing an ortho ester, one should be mindful that some ortho esters have low flash points. Various derivatives of those ortho esters can be synthesized by transesterification with variety of alcohols, sugars, or polyols.

Depending on the desired application, the ortho esters or the poly(ortho esters) may be water soluble, water insoluble, or solid. Generally speaking, water soluble ortho esters are easy to hydrolyze at lower temperature in comparison to water insoluble ortho esters. By making an ortho ester or a poly(ortho ester) more hydrophobic, the ortho ester may be more suitable for use in higher temperature applications. Also, poly(ortho esters) made by glycerol and trimethyl orthoformate are water soluble depending on the number of repeating units and can be used for lower temperature applications. One of the advantages of having a poly(ortho ester) over an ortho ester is that it has a higher flash point and a higher viscosity. Similarly, hydrophobic poly(ortho esters) may be synthesized, which are suitable for higher temperature applications. The choice of which particular ortho ester to use should be guided by such considerations as environmental factors, and the desired delay time before a sufficient amount of acid is generated to break the fluid-loss control pill. One should also note that ortho esters and polyortho esters can be selected to either give you formic or acetic acid on hydrolysis. For applications adjacent to acid-sensitive zones, weaker acids, such as formic and acetic acid, can be used with a slight increase in the amount of time needed for removal of surfactant gel.

The amount of a ortho ester breaker of the present invention needed to break a surfactant gel will depend on, inter alia, the composition of the surfactant gel, the temperature of the formation, the concentration of the surfactant, and other considerations recognized by one skilled in the art with the benefit of this disclosure. Generally speaking, the amount of the breaker to include is an amount sufficient to neutralize any inhibitor that may be present, and reduce the pH of the fluid-loss control pill to a level sufficient to break it. This amount will be determinable by one of ordinary skill in the art with the benefit of this disclosure. In some embodiments, this may be from about 0.1% to about 10% based on the volume of surfactant gel, excluding foam volume.

The ortho esters and/or poly(ortho esters) used in the ortho ester breakers of the present invention can have any suitable form. For instance, these compositions can be used in a solution form, a gel form, a solid form, or an emulsion form. In certain applications, a solution form may be useful, e.g., when a faster break of a pill is desired; in other applications, e.g., when a slower break is desirable, a gel or emulsion form may be most suitable. For the solution form, suitable exemplary solvents include propylene glycol, propylene glycol monomethyl ether, dipropylene glycol monomethyl ether, and ethylene glycol monobutyl ether. In some embodiments, mixtures of solvents and water may be beneficial, for example, to keep the ortho ester solubilized. The gel form of the ortho ester composition may be gelled with suitable polymers and/or surfactants. For the emulsion form, suitable emulsifiers include emulsifiers like "WS-44," which is commercially available from Halliburton Energy Services, Duncan, Okla.

To allow the breaker to hydrolyze to produce an acid and an alcohol, a source of water is needed. The water should be present in an amount of about 2 moles of water for about every 1 mole of ortho ester or poly(ortho ester) to an excess of water, which may help ensure the solubility of the reaction product of the reaction between the generated acid and the components in the surfactant gel. One of ordinary skill in the art with the benefit of this disclosure will recognize whether a suitable amount of water is present in either the gel, a present well fluid, or otherwise in the well bore for a desired application.

The ortho ester breakers of the present invention are generally stable at a pH of about 8 or above. To maintain the delay, preferably the pH should be maintained at 8 or above. To maintain this pH, the ortho ester breakers or the surfactant gel may comprise an inhibitor. The inhibitor may further delay the generation of the acid from the breaker, and also may neutralize the generated acid during the delay period. Suitable inhibitors include bases. Examples of some preferred inhibitors may include sodium hydroxide, potassium hydroxide, magnesium oxide, magnesium hydroxide, calcium oxide, calcium hydroxide, amines (such as hexamethylenetetramine), sodium carbonate, potassium carbonate, derivatives of these, and combinations of these. In certain embodiments, a small amount of a strong base as opposed to a large amount of a relatively weak base is preferred to achieve the delayed generation of the acid and the neutralization of the generated acid for a desired delay period.

Depending on the pH of the surfactant gel (i.e., the pH of the surfactant gel before raising the pH and/or before adding the breaker), the breaker may need to be incorporated in a certain manner depending on the stability of the breaker to the pH of the surfactant gel. This is because the degradation of ortho esters and poly(ortho esters) is thought to be acid-catalyzed. If the surfactant gel has a high pH (e.g., a pH of 8 or greater), then the ortho ester breaker can be added directly to the fluid-loss control pill with little risk of negatively impacting the breaker, followed by the inhibitor if desired. Optionally, an emulsifying surfactant may be added to keep the ortho ester breaker intimately mixed with the gel. Sometimes, however, the gel is a relatively hard gel and it may phase separate when mixed with the breaker.

Adding the ortho ester breaker by way of an emulsion may be useful in such instances, for example, in a remedial treatment to treat gel damage in a formation. Since ortho esters and poly(ortho esters) are relatively sensitive to acidic pH, if the gel is acidic, to effectively incorporate the breaker into the gel, a procedure may be used to protect the breaker from the gel while incorporating the breaker into the gel. In one embodiment, this may be accomplished by making an emulsion of the breaker in water, and adding it simultaneously with a pH increasing inhibitor to the gel. In another embodiment, the emulsion may be formed with a breaker, and a crosslinking agent in an aqueous fluid. An inhibitor may be added if desired. In another embodiment, a poly(ortho ester) may be synthesized such that it is sufficiently hydrophobic so that it can withstand the low pH without hydrolyzing while it is being incorporated into the base gel, e.g., as a solid or liquid.

Optionally, the ortho ester breakers may comprise: esters; aliphatic polyesters; ortho esters; poly(ortho esters); poly (lactides); poly(glycolides); poly(ε-caprolactones); poly(hydroxybutyrates); poly(anhydrides); aliphatic polycarbonates; poly(amino acids); poly(ethylene oxide); and polyphosphazenes, or copolymers thereof. Derivatives and combinations also may be suitable. The ortho ester breakers also may include: formate esters including, but are not limited to, ethylene glycol monoformate, ethylene glycol diformate, diethylene glycol diformate, glyceryl monoformate, glyceryl diformate, glyceryl triformate, triethylene glycol diformate and formate esters of pentaerythritol. Of these, ethylene glycol monoformate and diethylene glycol diformate may be preferred. Other suitable materials may be disclosed in U.S. Pat. Nos. 6,877,563 and 7,021,383, the disclosures of which are incorporated by reference.

The concentration of the ortho ester breaker may range from about 0.1% to about 10% based on the total volume of the fluids present. The particular concentration used in any particular embodiment depends on what ortho ester breaker is being used, and what percentage of acid/alcohol is generated. Other complex, interrelated factors that may be considered in deciding how much of the breaker to use include, but are not limited to, the composition of the formation, the temperature of the formation, the pressure of the formation, the particular fines and damage present in the formation (e.g., scale, skin, calcium carbonate, silicates, and the like), the particular breaker used, etc. To avoid undesirable salt precipitation problems, it may be desirable to combine formates and acetates or lactates to keep both below the over saturation concentration that would cause salts to precipitate in formation, but still achieve the acid potential necessary for the job.

The ortho ester breakers may be added to the surfactant gel at any point in time desired. In some instances, it may be desirable to pump the ortho ester breaker downhole with the fluid, and in other instances, it may be desirable to pump the ortho ester breaker at a later point in time. In some embodiments, the ortho ester breakers may be introduced into a subterranean formation before a surfactant gel, for instance in a pre-pad or a pad fluid. In other embodiments, the ortho ester breaker may be combined with the surfactant gel before being placed into a subterranean formation so that they effectively are placed together. In additional embodiments, the ortho ester breakers may be placed into a subterranean formation after the use of a surfactant gel, for example, to clean up gel residue that may be within the subterranean formation.

Optimized formulations ensure that the viscoelastic gel is rapidly formed under surface conditions, remains stable during pumping and placement into the fractures. Then, at a later time, the gel viscosity is significantly reduced by the controlled release of the ortho ester breaker.

The surfactant gels of the present invention optionally may comprise one or more cosurfactants, among other purposes, to facilitate the formation of and/or stabilize a foam, facilitate the formation of micelles (e.g., viscosifying micelles), increase salt tolerability, and/or stabilize the viscoelastic surfactant fluid. The cosurfactant may comprise any surfactant suitable for use in subterranean environments that does not adversely affect the surfactant gels. Examples of suitable cosurfactants are described in U.S. Pat. No. 6,258,859, the relevant disclosure of which is incorporated herein by reference. Examples of cosurfactants suitable for use in the present invention include, but are not limited to, linear $C_{10}$-$C_{14}$ alkyl benzene sulfonates ("LAS"), branched $C_{10}$-$C_{14}$ alkyl benzene sulfonates ("ABS"), tallow alkyl sulfates, coconut alkyl glyceryl ether sulfonates, sulfated condensation products of mixed $C_{10}$-$C_{18}$ tallow alcohols with from about 1 to about 14 moles of ethylene oxide, and mixtures of higher fatty acids containing from about 10 to about 18 carbon atoms. In certain embodiments, the cosurfactant may be present in an amount in the range of from about 0.1% to about 2% by volume of the viscoelastic surfactant fluid. In certain embodiments, the cosurfactant may be present in an amount in the range of from about 0.25% to about 0.5% by volume of the viscoelastic surfactant fluid. The type and amount of a cosurfactant suitable in a particular application of the present invention may depend upon a variety of factors, such as the type of surfactant present in the viscoelastic surfactant fluid, the composition of the aqueous-base fluid, the temperature of the fluid, and the like. A person of ordinary skill, with the benefit of this disclosure, will recognize when to include a cosurfactant in a particular application of the present invention, as well as the appropriate type and amount of cosurfactant to include.

The surfactant gels of the present invention optionally may comprise one or more salts, among other purposes, to modify the rheological properties (e.g., viscosity) of the viscoelastic surfactant fluids. The salts may be organic or inorganic. Examples of suitable organic salts include but are not limited to aromatic sulfonates and carboxylates (such as p-toluene sulfonate, naphthalene sulfonate), hydroxynaphthalene carboxylates, salicylate, phthalate, chlorobenzoic acid, salicylic acid, phthalic acid, 5-hydroxy-1-naphthoic acid, 6-hydroxy-1-naphthoic acid, 7-hydroxy-1-naphthoic acid, 1-hydroxy-2-naphthoic acid, 3-hydroxy-2-naphthoic acid, 5-hydroxy-2-naphthoic acid, 7-hydroxy-2-naphthoic acid, 1,3-dihydroxy-2-naphthoic acid, 3,4-dichlorobenzoate, trimethylammonium hydrochloride and tetramethylammonium chloride. Examples of suitable inorganic salts include water-soluble potassium, sodium, and ammonium salts, (such as potassium chloride and ammonium chloride), calcium chloride, calcium bromide, magnesium chloride and zinc halide salts. Examples of viscoelastic surfactant fluids comprising salts suitable for use in the present invention are described in U.S. Patent Publication No. 2004/0176478, the relevant disclosure of which is incorporated herein by reference. Any combination of the salts listed above also may be included in the viscoelastic surfactant fluids of the present invention. Where included, the one or more salts may be present in an amount in the range of from about 0.1% to about 30% by weight of the viscoelastic surfactant fluid. In certain embodiments, the one or more salts may be present in an amount in the range of from about 0.1% to about 10% by weight of the viscoelastic surfactant fluid. The type and amount of salts suitable in a particular application of the present invention may depend upon a variety of factors, such as the type of surfactant present in the viscoelastic surfactant fluid, the composition of the aqueous-base fluid, the temperature of the fluid, and the like. A person of ordinary skill, with the benefit of this disclosure, will recognize when to include a salt in a particular application of the present invention, as well as the appropriate type and amount of salts to include.

The surfactant gels of the present invention optionally may include one or more of a variety of well-known additives, such as gel stabilizers, fluid loss control additives, particulates, acids, corrosion inhibitors, catalysts, clay stabilizers, biocides, friction reducers, additional surfactants, solubilizers, pH adjusting agents, bridging agents, dispersants, flocculants, foamers, gases, defoamers, $H_2S$ scavengers, $CO_2$ scavengers, oxygen scavengers, scale inhibitors, lubricants, viscosifiers, weighting agents, bacteria, enzymes, transition metals, and the like. Additionally, in some embodiments, acids may be included in the surfactant gel. Suitable acids could include hydrochloric acid, hydrofluoric acid, formic acid, and acetic acid. Others may be suitable as well. These may be used, for example, in an acidizing application. Combinations of these are also suitable. Those of ordinary skill in the art, with the benefit of this disclosure, will be able to determine the appropriate type and amount of such additives for a particular application. For example, in some embodiments, it may be desired to foam a viscoelastic surfactant fluid of the present invention using a gas, such as air, nitrogen, or carbon dioxide. In certain embodiments, an acid may be included in a surfactant gel of the present invention, among other purposes, to dissolve at least a portion of a subterranean formation contacted with the viscoelastic surfactant fluid.

If desired, breakers, such as those discussed in U.S. Patent Publication No. 2006/0041028A1 (the disclosure of which are herein incorporated by reference), may be included in the surfactant gels of the present invention. Transition metals used optionally in combination with chelating agents or reducing agents may be used. Similarly, those breakers described in U.S. Pat. No. 7,052,901 (the disclosure of which are herein incorporated by reference) may be included in the surfactant gels of the present invention. Various biochemical agents, such as bacteria and enzymes, will directly degrade or digest a gel created by various viscoelastic surfactants in an aqueous fluid, or the biochemical agents will degrade or digest other materials in the gel such as alcohols, glycols, starches, potassium or other formate, and the like to produce by-products that will reduce the viscosity of the gel either directly, or by disaggregation or rearrangement of the VES micellar structure.

These compositions and methods of the present invention may be used in conjunction with viscoelastic surfactant systems based upon cationic surfactants, such as erucyl methyl bis(2-hydroxyethyl) ammonium chloride (hereinafter referred to as "EMHAC"), and zwitterionic surfactants, such as betaine surfactants. However, the methods and compositions of the present invention are also presented for breaking viscoelastic surfactant fluids based on anionic, cationic, nonionic and zwitterionic surfactants. Examples of commercially-available viscoelastic surfactants suitable for use in the present invention may include, but are not limited to, "Mirataine BET-O 30™" (an oleamidopropyl betaine surfactant available from Rhodia Inc., Cranbury, N.J.), "Ethoquad O/12 PG" surfactant (a cationic surfactant available from from Akzo Nobel Chemicals, Chicago, Ill.), "Ethomeen T/12™" (a fatty amine ethoxylate surfactant available from Akzo Nobel Chemicals, Chicago, Ill.), "Ethomeen S/12™" (a fatty amine ethoxylate surfactant available from Akzo Nobel Chemicals, Chicago, Ill.), and "Rewoteric AM TEG™" (a tallow dihydroxyethyl betaine amphoteric surfactant available from Degussa Corp., Parsippany, N.J.).

The surfactant gels and ortho ester breakers of the present invention may be used for carrying out a variety of subterranean well treatments, including, but not limited to, fracturing, gravel packing, frac-packing, and plugging. They may also be used as diverting agents, conformance agents, fluid loss pills, and as gel pigs if desired. The intended end use will dictate the viscosities needed for the fluid, e.g., gel pigs may require a higher viscosity whereas a fracturing fluid may require a lower viscosity. One of ordinary skill in the art with the benefit of this disclosure will recognize the appropriate viscosity for a chosen application.

To facilitate a better understanding of the present invention, the following examples of certain aspects of some embodiments are given. In no way should the following examples be read to limit, or define, the entire scope of the invention.

EXAMPLES

The following fluid was prepared: 7% KCl containing 5% Mirataine BET-O 30™ (an oleamidopropyl betaine surfactant available from Rhodia Inc., Cranbury, N.J.), 0.1% oleic acid, and 0.25% tripropylorthoformate at a pH of about 12. The sample's initial room temperature apparent viscosity was 50 cp at 511 $s^{-1}$. The viscosity was measured using a Fann 35A viscometer, R1B1 and a #1 spring at 511 $s^{-1}$. After heating for four hours, the room temperature viscosity was about 50 cp. The heating was done at 175° F. for four hours. After breaking the viscosity was below 10 cp at 511 $s^{-1}$.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method comprising:
providing a surfactant gel having a first viscosity that comprises an aqueous base fluid and a surfactant wherein the surfactant gel comprises at least one metal ion having at least two oxidation states wherein at least one of the oxidation states interferes with the ability of the surfactant to form viscosifying micelles;
wherein the surfactant is selected from a group consisting of a methyl ester sulfonate; a sulfosuccinate; a taurate; an amine oxide; an ethoxylated fatty amine; a quaternary ammonium compound; an erucyl methyl bis(2-hydroxyethyl) ammonium chloride; and a combination thereof;
providing an ortho ester breaker;
contacting the surfactant gel with the ortho ester breaker;
allowing the ortho ester breaker to hydrolyze to produce an acid and an alcohol; and
allowing the alcohol to interact with the surfactant gel so as to reduce the first viscosity of the surfactant gel to a second viscosity.

2. The method of claim 1 wherein the surfactant gel is located within a subterranean formation.

3. The method of claim 1 wherein the surfactant comprises a surfactant chosen from the group consisting of: cationic surfactant, an anionic surfactant, a zwitterionic surfactant, and an amphoteric surfactant.

4. The method of claim 1 wherein the metal ion is encapsulated.

5. The method of claim 1 wherein the surfactant gel comprises a redox reagent.

6. The method of claim 1 wherein the ortho ester comprises a structure corresponding to the following formula: RC(OR')(OR")(OR'''), wherein R' R", and R''' are not hydrogen.

7. The method of claim 1 wherein the ortho ester comprises an ortho ester or a polyorthoester chosen from the group consisting of: orthoacetates; trimethyl orthoacetate; triethyl orthoacetate; tripropyl orthoacetate; triisopropyl orthoacetate; tributyl orthoacetates; a poly(orthoacetate); an orthoformate; trimethyl orthoformate; triethyl orthoformate; tripropyl orthoformate; triisopropyl orthoformate; tributyl orthoformate; a poly(orthoformate); an orthopropionate; trimethyl orthopropionate; triethyl orthopropionate; tripropyl orthopropionate; triisopropyl orthopropionate; tributyl orthopropionate; a poly(orthopropionate); and a polyfunctional alcohol.

8. The method of claim 1 wherein the ortho ester breaker comprises a compound chosen from the group consisting of: esters; aliphatic polyesters; ortho esters; poly(ortho esters); poly(lactides); poly(glycolides); poly(ϵ-caprolactones); poly(hydroxybutyrates); poly(anhydrides); aliphatic polycarbonates; poly(amino acids); poly(ethylene oxide); polyphosphazenes; formate esters; ethylene glycol monoformate; ethylene glycol diformate; diethylene glycol diformate; glyceryl monoformate; glyceryl diformate; glyceryl triformate; triethylene glycol diformate; formate esters of pentaerythritol; copolymers thereof; and derivatives and combinations thereof.

9. The method of claim 1 wherein the surfactant gel comprises a component chosen from the group consisting of: cosurfactants; salts; organic salts; inorganic salts; gel stabilizers; fluid loss control additives; particulates; acids; corrosion inhibitors; catalysts; clay stabilizers; biocides; friction reducers; second surfactants; solubilizers; pH adjusting agents; bridging agents; dispersants; flocculants; foamers; gases; bacterias; enzymes; transition metals; defoamers; $H_2S$ scavengers; $CO_2$ scavengers; oxygen scavengers; scale inhibitors; lubricants; viscosifiers; and weighting agents.

10. The method of claim 1 wherein the surfactant gel comprises an acid chosen from the group consisting of: hydrochloric acid, hydrofluoric acid, formic acid, and acetic acid.

11. A method comprising:
providing a surfactant gel that comprises an aqueous base fluid and a surfactant having a first viscosity and wherein the surfactant gel comprises a redox reagent;
wherein the surfactant is selected from a group consisting of a methyl ester sulfonate; a sulfosuccinate; a taurate; an amine oxide; an ethoxylated fatty amine; a quaternary ammonium compound; an erucyl methyl bis(2-hydroxyethyl) ammonium chloride; and a combination thereof;
placing the surfactant gel into a subterranean formation;
providing an ortho ester breaker;
contacting the breaker with the surfactant gel;
allowing the breaker to hydrolyze to produce an acid and an alcohol; and
allowing the alcohol to interact with the surfactant gel so as to reduce the first viscosity of the surfactant gel to a second viscosity.

12. The method of claim 11 wherein the surfactant gel is placed in the subterranean formation as part of a fracturing treatment, a gravel packing operation, a fracpacking operation, a plugging operation, or as a diverting agent.

13. The method of claim 11 wherein the surfactant comprises a surfactant chosen from the group consisting of: cationic surfactant, an anionic surfactant, a zwitterionic surfactant, and an amphoteric surfactant.

14. The method of claim 11 wherein the ortho ester comprises a structure corresponding to the following formula: $RC(OR')(OR'')(OR''')$, wherein $R'$, $R''$, and $R'''$ are not hydrogen.

15. The method of claim 11 wherein the ortho ester comprises an ortho ester or a polyorthoester chosen from the group consisting of: orthoacetates; trimethyl orthoacetate; triethyl orthoacetate; tripropyl orthoacetate; triisopropyl orthoacetate; tributyl orthoacetates; a poly(orthoacetate); an orthoformate; trimethyl orthoformate; triethyl orthoformate; tripropyl orthoformate; triisopropyl orthoformate; tributyl orthoformate; a poly(orthoformate); an orthopropionate; trimethyl orthopropionate; triethyl orthopropionate; tripropyl orthopropionate; triisopropyl orthopropionate; tributyl orthopropionate; a poly(orthopropionate); and a polyfunctional alcohol.

16. The method of claim 11 wherein the surfactant gel comprises at least one metal ion having at least two oxidation states wherein at least one of the oxidation states interferes with the ability of the surfactant to form viscosifying micelles.

17. The method of claim 16 wherein the metal ion is encapsulated.

* * * * *